United States Patent
Hsin

(10) Patent No.: US 7,992,123 B2
(45) Date of Patent: Aug. 2, 2011

(54) METHOD OF ENGINEERING CHANGE TO SEMICONDUCTOR CIRCUIT EXECUTABLE IN COMPUTER SYSTEM

(75) Inventor: Chien-Jung Hsin, Hsinchu (TW)

(73) Assignee: Dorado Design Automation, Inc., Hsinchu (TW)

( * ) Notice: Subject to any disclaimer, the term of this patent is extended or adjusted under 35 U.S.C. 154(b) by 688 days.

(21) Appl. No.: 12/045,196

(22) Filed: Mar. 10, 2008

(65) Prior Publication Data

US 2008/0222595 A1 Sep. 11, 2008

Related U.S. Application Data

(60) Provisional application No. 60/893,889, filed on Mar. 9, 2007.

(51) Int. Cl.
*G06F 17/50* (2006.01)

(52) U.S. Cl. .................. 716/132; 716/104; 716/106

(58) Field of Classification Search .................. 716/2, 5, 716/18, 104, 106, 132
See application file for complete search history.

(56) References Cited

U.S. PATENT DOCUMENTS

| 6,484,292 | B1 | 11/2002 | Jain | |
|---|---|---|---|---|
| 6,530,073 | B2 * | 3/2003 | Morgan | 716/18 |
| 6,581,199 | B2 | 6/2003 | Tanaka | |
| 2002/0162086 | A1 * | 10/2002 | Morgan | 716/18 |
| 2004/0025127 | A1 * | 2/2004 | Takenaka | 716/5 |

OTHER PUBLICATIONS

IEEE Standard Verilog Hardware Description Language, IEEE Stad 1364-2001, Sep. 28, 2001, pp. 1-791.*

* cited by examiner

*Primary Examiner* — Vuthe Siek
(74) *Attorney, Agent, or Firm* — Kirton & McConkie; Evan R. Witt

(57) ABSTRACT

A method of engineering change to a semiconductor circuit includes: performing a first synthesis with optimization of a first HDL code to generate a first circuit; performing a first physical design of the first circuit to generate a post layout circuit; modifying the first HDL code to generate a second HDL code, and performing a second synthesis with optimization of the first and second HDL codes while forcibly preserving elements to generate a second circuit and a third circuit, respectively; performing an ECO cone-pair extraction operation of the second and third circuit to generate at least one ECO cone-pair; and obtaining an ECO logic and an element to be replaced according to the ECO cone-pair and the post layout circuit, and then replacing the element to be replaced in the post layout circuit with the ECO logic gate circuit, thereby modifying the post layout circuit into a post layout ECO circuit.

6 Claims, 10 Drawing Sheets

METHOD OF ENGINEERING CHANGE TO SEMICONDUCTOR CIRCUIT EXECUTABLE IN COMPUTER SYSTEM

CROSS-REFERENCE TO RELATED APPLICATION

This application claims the benefit of U.S. Provisional Application No. 60/893,889, filed Mar. 9, 2007, which application is incorporated by reference.

FIELD OF THE INVENTION

The present invention relates to a circuit-design-modifying method, and more particularly to a method of engineering change to a semiconductor circuit executable in a computer system.

BACKGROUND OF THE INVENTION

A scheme of a conventional IC design is depicted in FIG. 1. Generally, a hardware description language (HDL) at a register transfer level (RTL), e.g. Verilog HDL, is used by circuit designers to describe an IC to be developed. The function of the HDL is then verified by an electronic-design-automation (EDA) tool program, e.g. a Verilog simulator, so as to generate an HDL code S0. Subsequently, the HDL code S0 is synthesized with a constraint that is designated by designers to specify the target timing, size, . . . etc. to output an optimized circuit C0, which is so-called as synthesis with optimization (Step 101). On the condition that the pre-layout simulation complies with the requirement, a physical design of the circuit C0 is performed, which includes placement, clock tree synthesis, timing optimization, and routing (Step 102). Finally, a post layout circuit L0 is obtained. The major difference between L0 and C0 is that L0 is with cells inserted during clock tree synthesis and/or timing optimization.

If there are design errors or specification change, designers normally modify logical functions of the design directly on the post layout circuit L0, which is known as Engineering Change Order (ECO) in order to skip the time-consuming physical design of Step 102. Designers incrementally apply the corresponding change to the physical design and then repeat the original synthesis, placement, and routing process again. By directly adding minor modifications to the post layout circuit L0, instead of modifying the HDL code S0, time and effort can be saved so as to speed up the commercialization of products.

However, the conventional ECO is implemented by a manual process. That is, after the modified HDL code Sn is simulated and verified, it is necessary to manually locate the elements to be modified (e.g. n2) in the post layout circuit L0 according to the contents (e.g. f2) of the HDL code Sn (Step 103). Then ECO logic 100 is added to make minor modification to the post layout circuit L0 (Step 104). The manual task is difficult and time-consuming. Furthermore, when making the change on the post layout circuit L0, a modified element could have been optimized away, hidden inside another element or entitled with a meaningless name by the logic optimization process of synthesis. As a result, the modified element is hard to be located in the post layout circuit. Even if the modified element is successfully located, designers still have to take advantage of Boolean Algebras and their experience in logic circuit designs to pattern proper logic circuit elements, which is another time-consuming manual task.

For solving the above problems, a logic cone data structure which can be constructed by doing Fan-In Trace 20 on a logic circuit is applied, as shown in FIG. 2. Referring to FIG. 2, a hierarchical module-based logic circuit consists of logic cones. The definition of a logic cone as follows:
1. a logic cone must be with an end element and N start elements, where N=1, 2, 3, . . . n;
2. the end element can be a primary output port or a sequential element or an input pin of black boxes; and
3. the start element can be a primary input port or a sequential element or an output pin of black boxes.

In FIG. 2, the logic circuit has primary inputs i1, i2, i3, i4, and primary output o1, o2, and a sequential element implemented with a flip-flop f1. For the sequential logic cone 21, the end element is the flip-flop f1 and the start elements are the primary inputs i1 and i2. For the output logic cone 22, the end element is the primary output port o2 and the start elements are the primary input ports i2, i3 and i4. On the other hand, for the output logic cone 23, the end element is the primary output port o1 but there is only one input element, i.e. the sequential element f1. Accordingly, the logic circuit includes three logic cones 21, 22 and 23 with f1, o1 and o2 as end elements.

Some approaches have been proposed in U.S. Pat. Nos. 6,581,199 and 6,484,292 for improving the manual ECO. For example, referring to FIG. 3, a new (modified) HDL code Sn is synthesized for generating a circuit (Cn) by way of synthesis with optimization (Step 302). The original circuit C0 is then processed into a post layout circuit L0 by way of physical design (Step 304). Then in Step 306, the post layout circuit L0 and the modified circuit Cn are built with respective logic cone data structure by way of a Fan-In Trace process. The names of the logic cones are then compared to assign the logic cones with the same end element as cone pairs, and then apply Equivalent Check (EC) to find the cone pairs which are functionally non-equivalent. Such non-equivalent cone pairs are where the ECO is to be applied and thus called ECO cone pairs. The process of finding the ECO cone pairs is called ECO cone pair extraction. Next in Step 307, for each ECO cone pair, transfer (or remap using technology mapping) the ECO logic of Cn into L0 to get the post layout ECO circuit Ln.

A problem of the prior art is that the amount of the ECO logic can be much more than that of manual ECO if the modified element is not an end element of a logic cone. When the modified element is not an end element of a logic cone but located inside the logic cone, the amount of the extracted ECO logic will be more than that is necessary, and thus more trouble for physical design change is rendered in terms of timing and routing.

Please refer to FIG. 4 which illustrates an example of the ECO of FIG. 3. In the example, only the logic expression f2 of the HDL code S0 is changed. However, as the corresponding modified portion is hidden into the logic cone 40 after the operation 401 of synthesis with optimization, the end element of the ECO cone pair resulting from the ECO cone-pair extraction 402 is the output f3 rather than the logic gate n1 or n2. Therefore, minimum ECO cone pair with least ECO logic cannot be found by such a method, and the amount of the ECO logic obtained in the operation 402 is more than that obtained in the manual ECO.

Obviously, the prior art cannot obtain the minimum ECO cone pair by comparing the optimized post layout circuit L0 and modified circuit Cn. Furthermore, the amount of ECO gates 400 in the post layout circuit Ln will be much more than expected.

SUMMARY OF THE INVENTION

Therefore, the present invention provides a circuit-design-modifying method which can be automatically executed to locate a minimal ECO cone pair.

The present invention provides a circuit-design-modifying method executed in a computer system, which includes steps of: performing a first synthesis-with-optimization operation of a first HDL code to generate a first circuit; performing a first physical design of the first circuit to generate a post layout circuit; modifying the first HDL code to generate a second HDL code, and performing a second synthesis-with-optimization operation of the first and second HDL codes while forcibly preserving specified elements to generate a second circuit and a third circuit, respectively; performing an ECO cone-pair extraction operation of the second circuit and the third circuit to generate at least one ECO cone pair; and obtaining an ECO logic and an element to be replaced according to the ECO cone pair and the post layout circuit, and then replacing the element to be replaced in the post layout circuit with the ECO logic, thereby modifying the post layout circuit into a post layout ECO circuit.

In an embodiment, the second synthesis-with-optimization operation forcibly preserves all left-hand-side elements.

In an embodiment, the ECO cone-pair extraction operation of the second circuit and the third circuit includes: building logic cone data structures of the second circuit and the third circuit, respectively, by a Fan-In Trace technique; and comparing names of the logic cones to assign a plurality of logic cone pairs, and locating the at least one ECO cone pair from the plurality of logic cone pairs by an Equivalent Check (EC) technique.

In an embodiment, the step of obtaining the ECO logic according to the ECO cone pair and the post layout circuit includes: executing Equivalent Check (EC) according to an ECO logic cone belonging to the second circuit to locate an end element to be replaced in the post layout circuit, which is equivalent to an end element of the ECO logic cone; marking the end element to be replaced and an ECO logic cone which belongs to the third circuit with respective effective ECO flags; and executing Equivalent Check (EC) to define a border of equivalence according to the marked end element to be replaced and the marked ECO logic cone, wherein the ECO logic is a set of logic gates including the end element of the marked logic cone and those within the border of equivalence.

In an embodiment, the border of equivalence is defined by: searching equivalent elements of the marked end element and the marked ECO logic cone along a plurality of upstream paths; and defining the border of equivalence with the equivalent elements.

In an embodiment, the step of obtaining the element to be replaced according to the ECO cone pair and the post layout circuit includes: executing Equivalent Check (EC) according to an ECO logic cone belonging to the second circuit to locate an end element to be replaced in the post layout circuit, which is equivalent to an end element of the ECO logic cone; marking the end element to be replaced and an ECO logic cone which belongs to the third circuit with respective effective ECO flags; and executing Equivalent Check (EC) to define a border of equivalence according to the marked end element to be replaced and the marked ECO logic cone, wherein the element to be replaced is a set of logic gates including the marked end element to be replaced and those within the border of equivalence.

In an embodiment, the element to be replaced is removed from the post layout circuit to form an intermediate post layout circuit, and the ECO logic is added to the intermediate post layout circuit to form the post layout ECO circuit.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
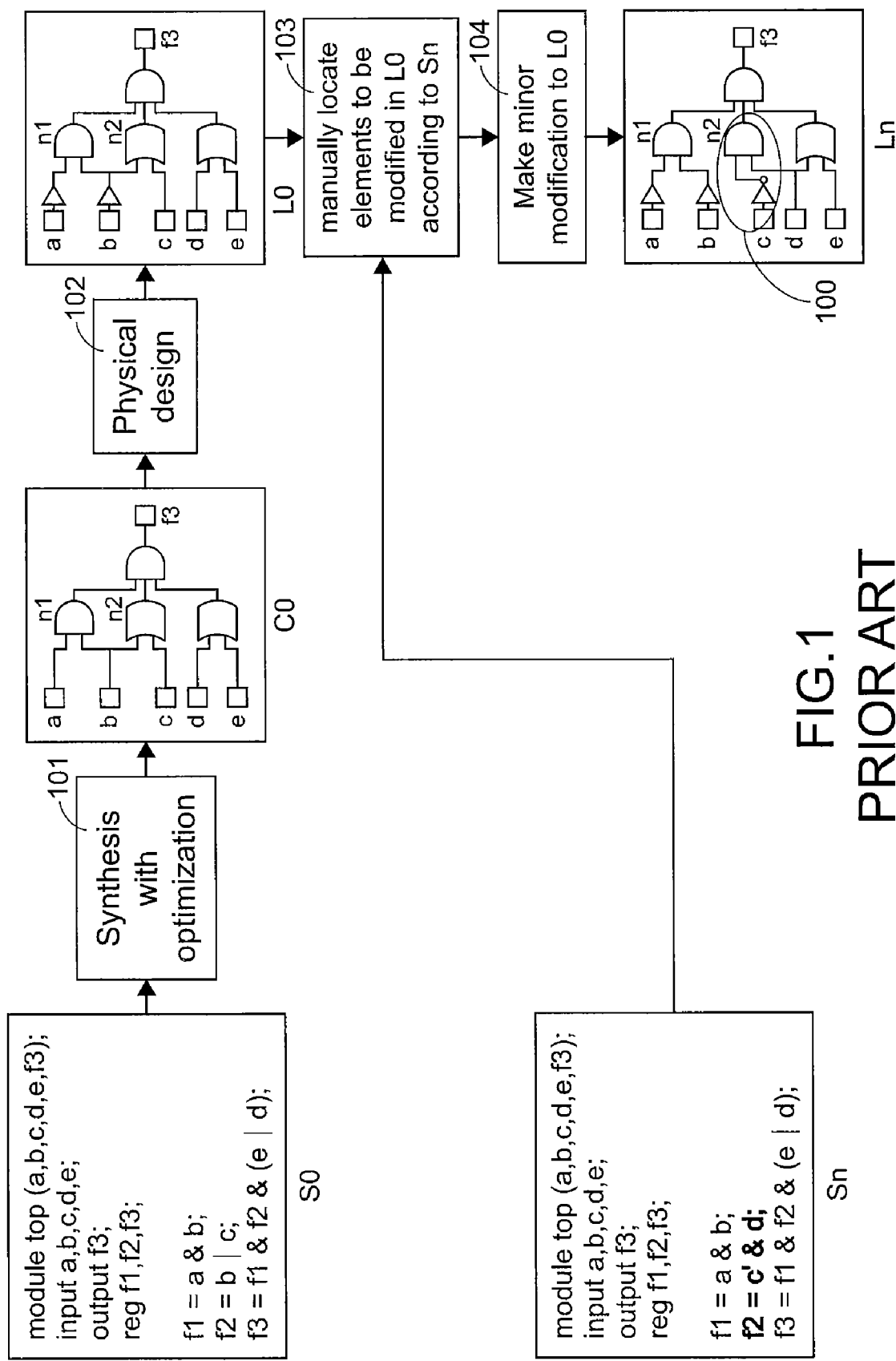
FIG. 1 is a scheme illustrating a conventional IC design.
Figure 2:
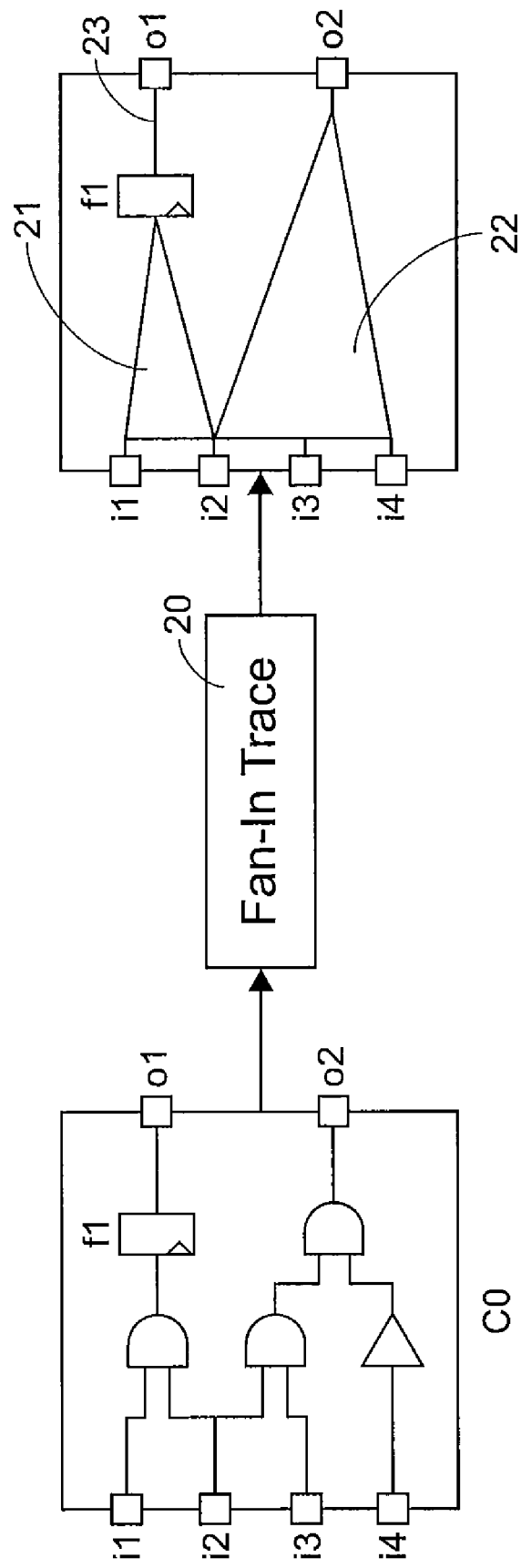
FIG. 2 is a schematic diagram illustrating a logic cone.
Figure 3:
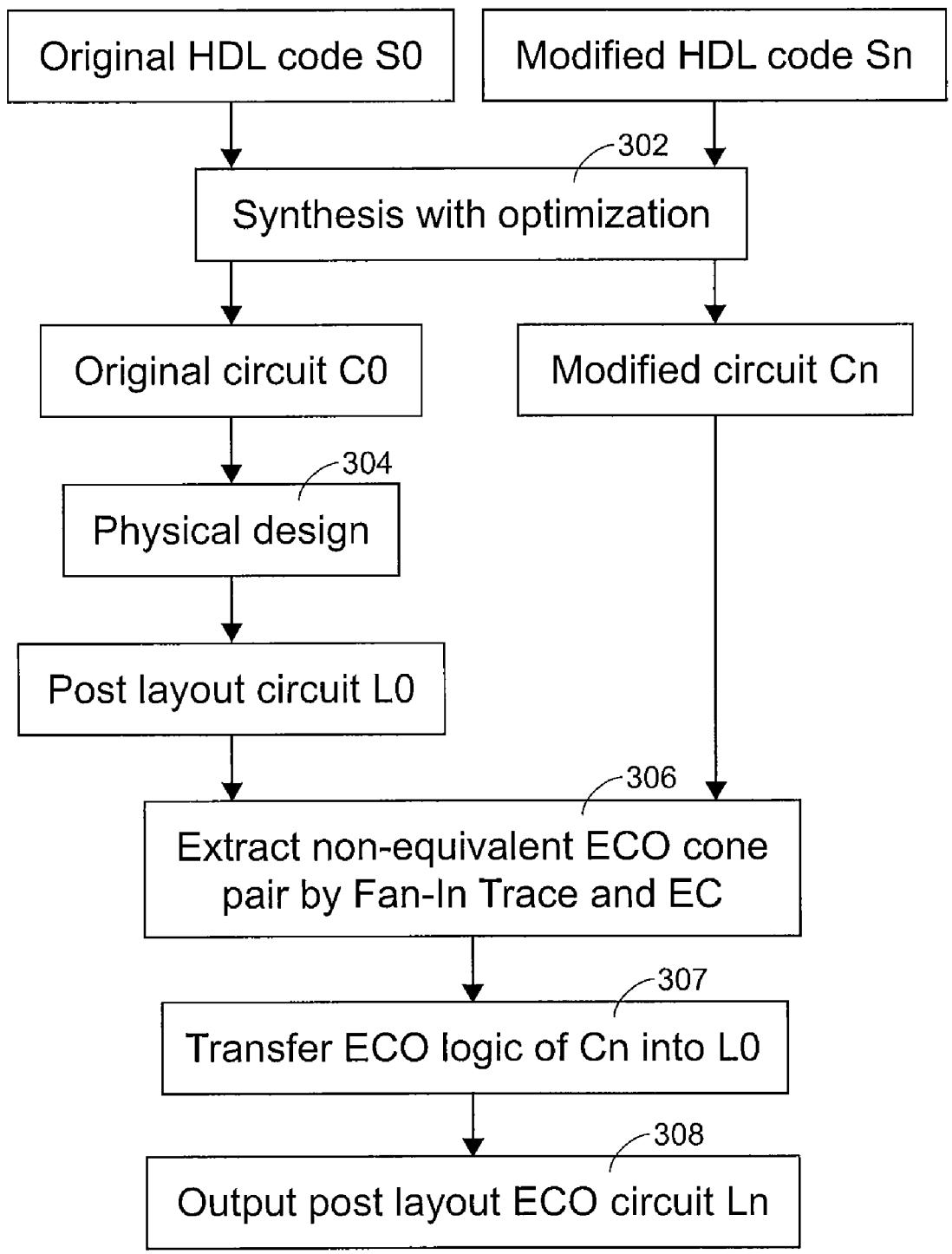
FIG. 3 is a flowchart illustrating an automatically executed ECO.
Figure 4:
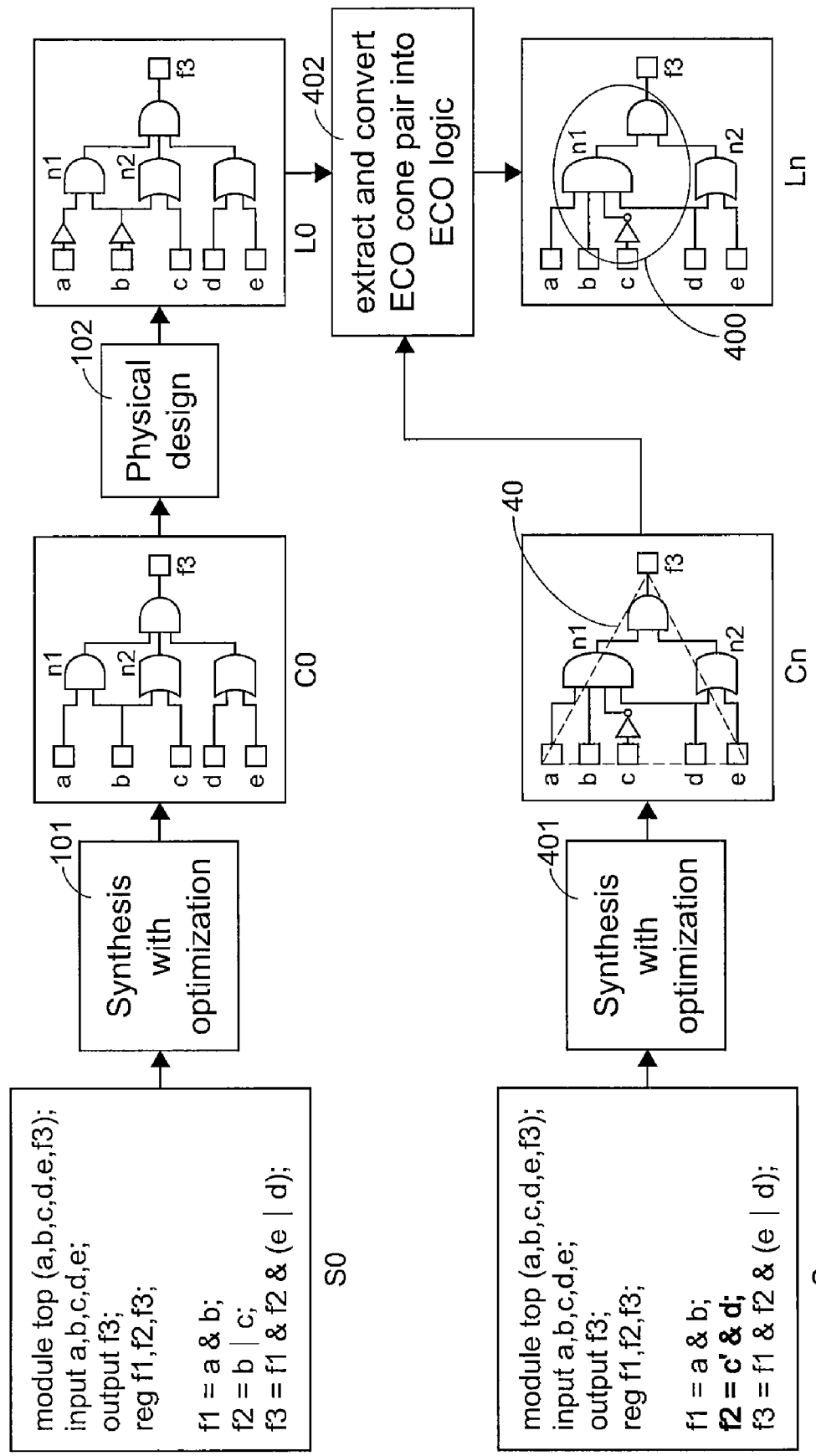
FIG. 4 is a scheme illustrating an example of the ECO of FIG. 3.
Figure 5:
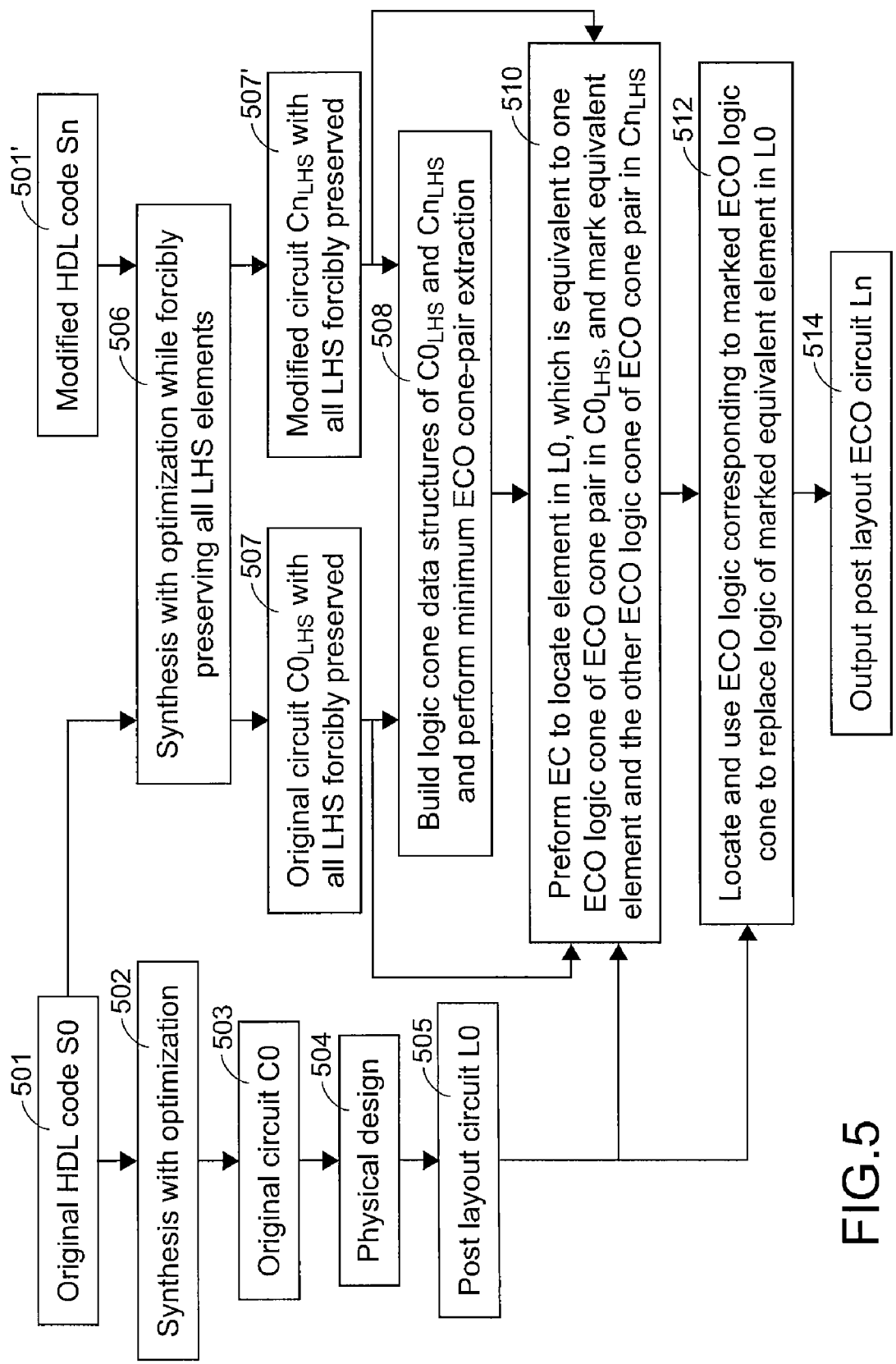
FIG. 5 is a flowchart illustrating an automatically executed ECO according to an embodiment of the present invention.

Please refer to the flowchart of FIG. 5. In a circuit-design-modifying method according to an embodiment of the present invention, after the original HDL code S0 is obtained (Step 501), an operation of synthesis with optimization 502 is performed (Step 502) to obtain an original circuit C0 (Step 503). The original circuit C0 is then processed by a physical design operation (Step 504) to obtain an optimized post layout circuit L0 (Step 505). On the other hand, after a modified HDL code Sn is obtained (Step 501'), both the original HDL code S0 and the modified HDL code Sn are executed with another synthesis with optimization (Step 506). This synthesizing operation, however, requires optimization with all LHS (left-hand side) preservation. That is, all the left-hand side signals are forcibly preserved to prevent certain elements and input signals thereof from being hidden into and combined with other elements due to logic simplification included in the synthesizing operation. As a result, an original circuit $C0_{LHS}$ with all LHS signals preserved and a modified circuit $Cn_{LHS}$ with all LHS signals preserved can be obtained (Step 507 and Step 507'). In this way, the modified element can exist in the modified circuit $Cn_{LHS}$ as an end element just as the original one in the original circuit $C0_{LHS}$, which will make sure that the minimum ECO cone pair in terms of the amount of ECO logic can be located after extraction.

In the extracting Step 508, logic cone data structures are built in the circuits $C0_{LHS}$ and $Cn_{LHS}$ by way of Fan-In Trace. The names of the logic cones are then compared to assign the logic cones with the same end element as cone pairs, and then apply Equivalent Check (EC) to find the cone pairs which are functionally non-equivalence, i.e. ECO cone pairs. The extracted ECO cone pair will be the minimum one in terms of the amount of ECO logic.

Next, Equivalent Check is applied to locate an equivalent element, which is equivalent to the ECO logic cone corresponding to the original circuit $C0_{LHS}$ in the ECO cone pair, in the optimized post layout circuit L0 (Step 510). Meanwhile, the equivalent element and the other ECO logic cone corresponding to the modified circuit $Cn_{LHS}$ in the ECO cone pair are both marked with respective effective ECO flags. Subsequently in Step 512, an ECO logic corresponding to the marked ECO logic cone is found to replace the logic of the marked equivalent element in the post layout circuit L0, thereby obtaining a post layout ECO circuit Ln (Step 514).

Figure 6A:
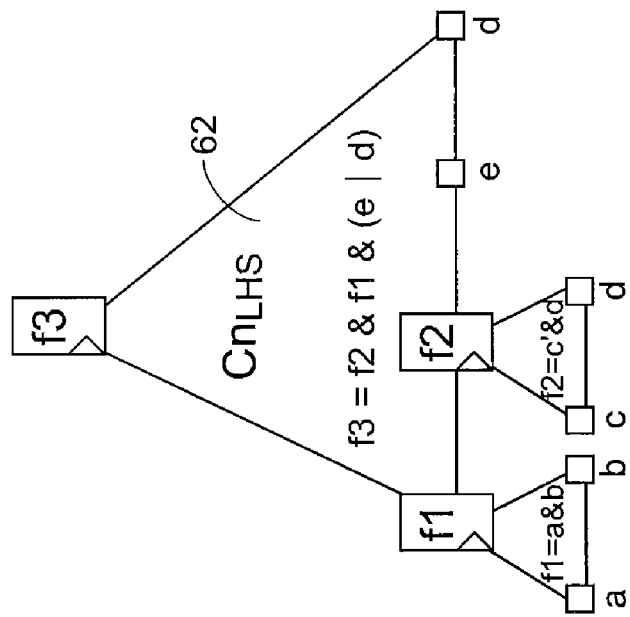
FIGS. 6A~6D are schemes illustrating details of respective steps of an automatically executed ECO according to an embodiment of the present invention.
Figure 6A:
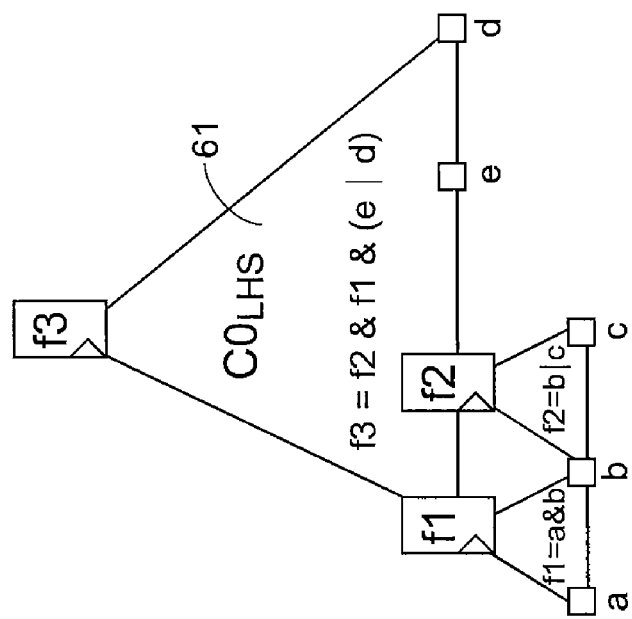

For facilitating understanding of the above-described embodiment, examples are given with reference to FIGS. 6A~D. FIG. 6A exemplifies two logic cones 61 and 62 built by way of Fan-In Trace according to the original circuit $C0_{LHS}$ and the modified circuit $Cn_{LHS}$, respectively. It is to be noted that since both the $C0_{LHS}$ and $Cn_{LHS}$ preserve all LHS elements, there will be no elements or input signals disappearing due to optimization. In other words, the modified element f2 (f2=blc in $C0_{LHS}$ and f2=c'&d in $Cn_{LHS}$) is preserved in both circuits $C0_{LHS}$ and $Cn_{LHS}$. It is apparent the construction of the two logic cones 61 and 62 are substantially the same.

Figure 6B:
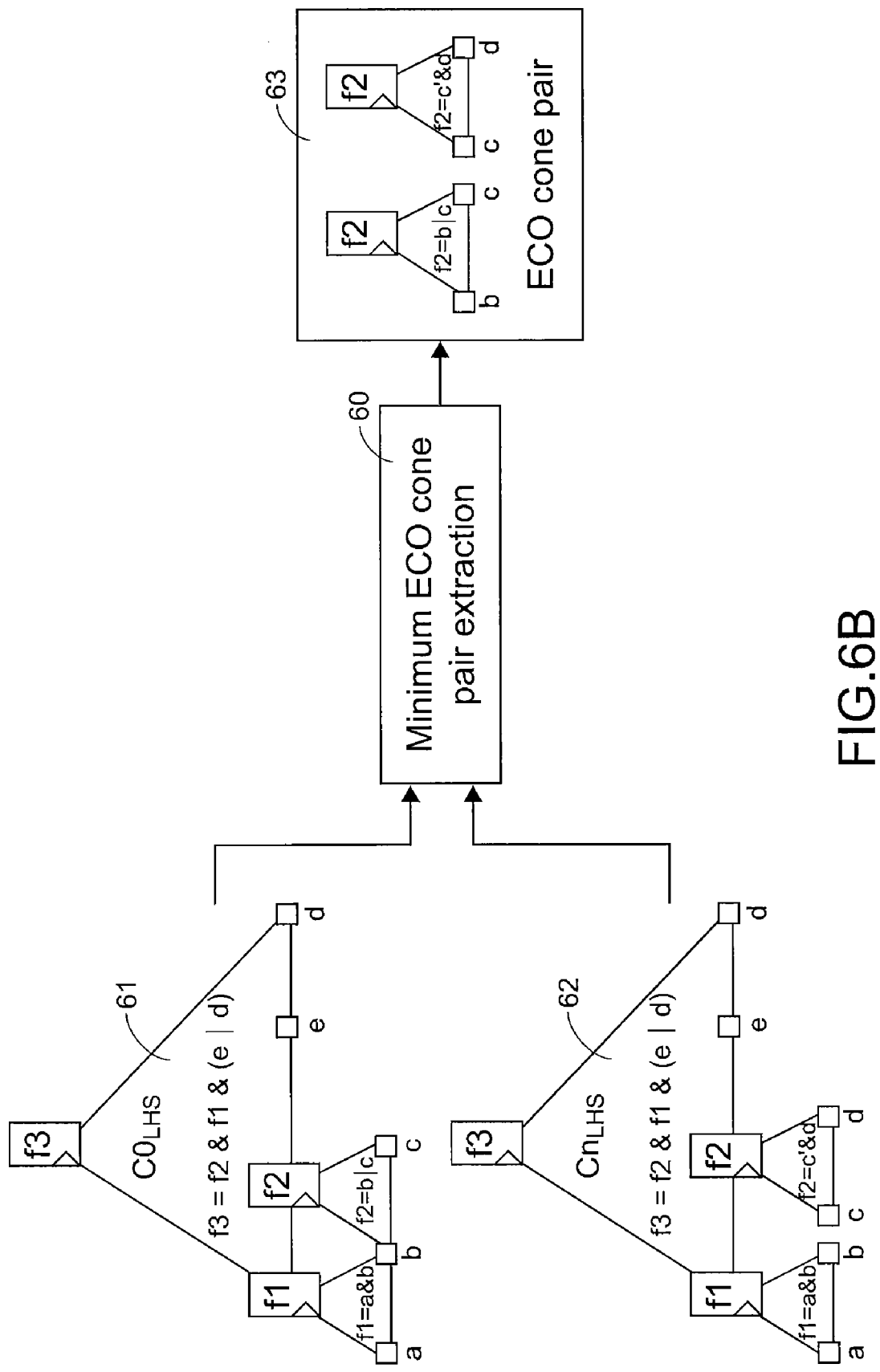

After the operation of synthesis with optimization while preserving all LHS logic cones, Minimal Size ECO Cone-Pair Extraction 60 is performed to obtain the ECO cone pair 63, as illustrated in FIG. 6B.

Figure 6C:
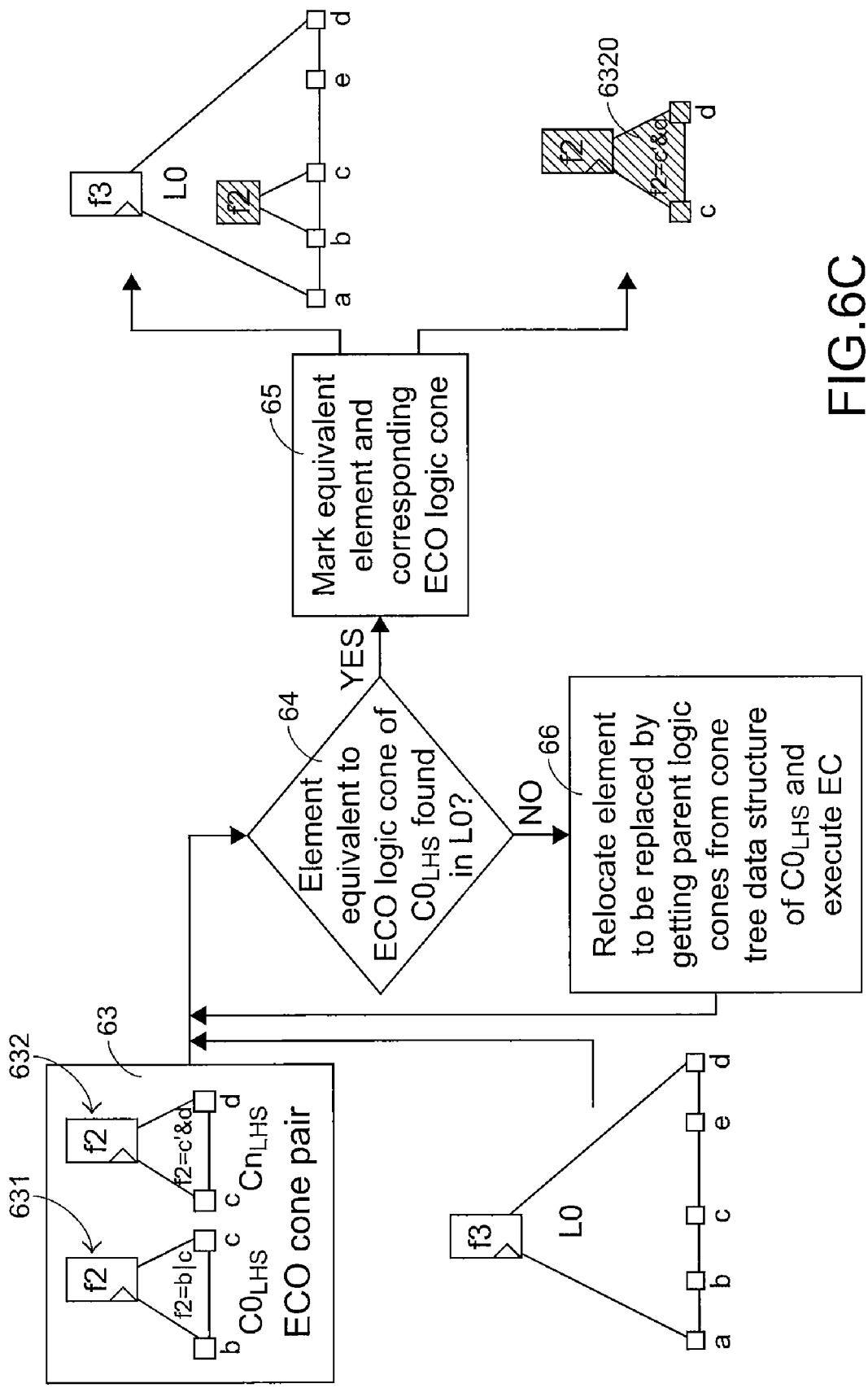
Figure 6D:
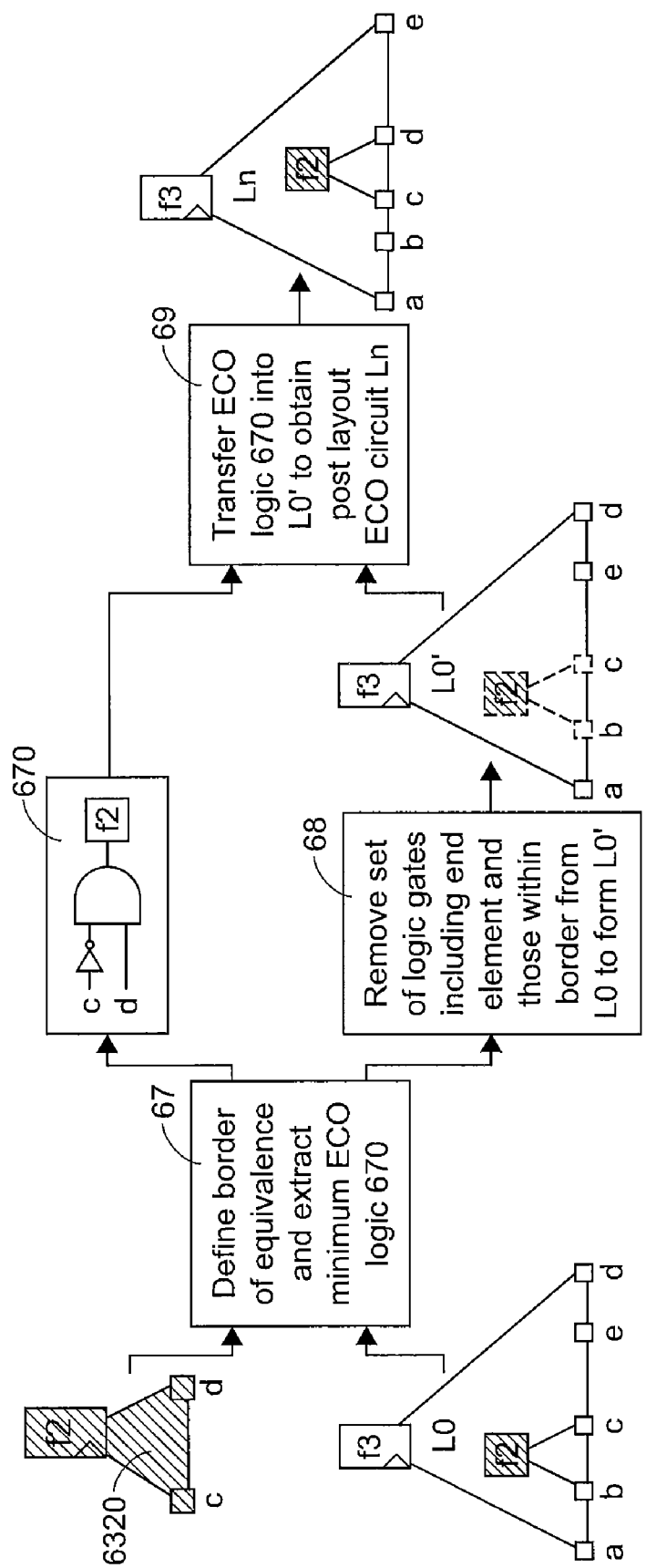

Then referring to FIG. 6C, Equivalent Check (EC) 64 is applied to look for an element to be replaced, which is equivalent to an end element f2 of the logic cone 631 of the ECO cone pair 63. If the element to be replaced is found by the EC operation 64, mark the element to be replaced with an effective ECO flag. The corresponding logic cone 632 of the ECO cone pair 63 is also marked with an effective ECO flag in the marking operation 65. A marked ECO logic cone 6320 for replacement is obtained accordingly. On the other hand, if there is no element to be replaced found in the post layout circuit L0 in the previous EC operation 64, relocation 66 of the element to be replaced can be repetitively performed by getting the parent logic cones of the ECO logic cone 631 from the cone tree data structure of the original circuit $C0_{LHS}$ and executing the EC operation 64 again until the element to be replaced is found in L0.

After the element f2 to be replaced is found and marked and the corresponding ECO logic cone 6320 is marked, a border of equivalence is defined by way of EC technique (FIG. 6D, Operation 67), which will be described later in more detail. A minimum ECO logic 670 is thus obtained as a set of logic gates including the end element f2 and those within the border. On the other hand, remove a set of logic gates including the element f2 to be replaced and those within the border to obtain an intermediate post layout circuit L0' (Operation 68). The minimum ECO logic 670 is then transferred to the intermediate post layout circuit L0' to obtain the modified post layout circuit Ln (Operation 69). Alternatively, in Operation 69, Technology Remapping of ECO logic can be performed before being transferred to the intermediate post layout circuit L0' to obtain the modified post layout circuit Ln. The Technology Remapping technique is a well developed synthesis technique in the art, which remaps a circuit to a different circuit according to physical (area/placement) and timing constraints.

Figure 7:
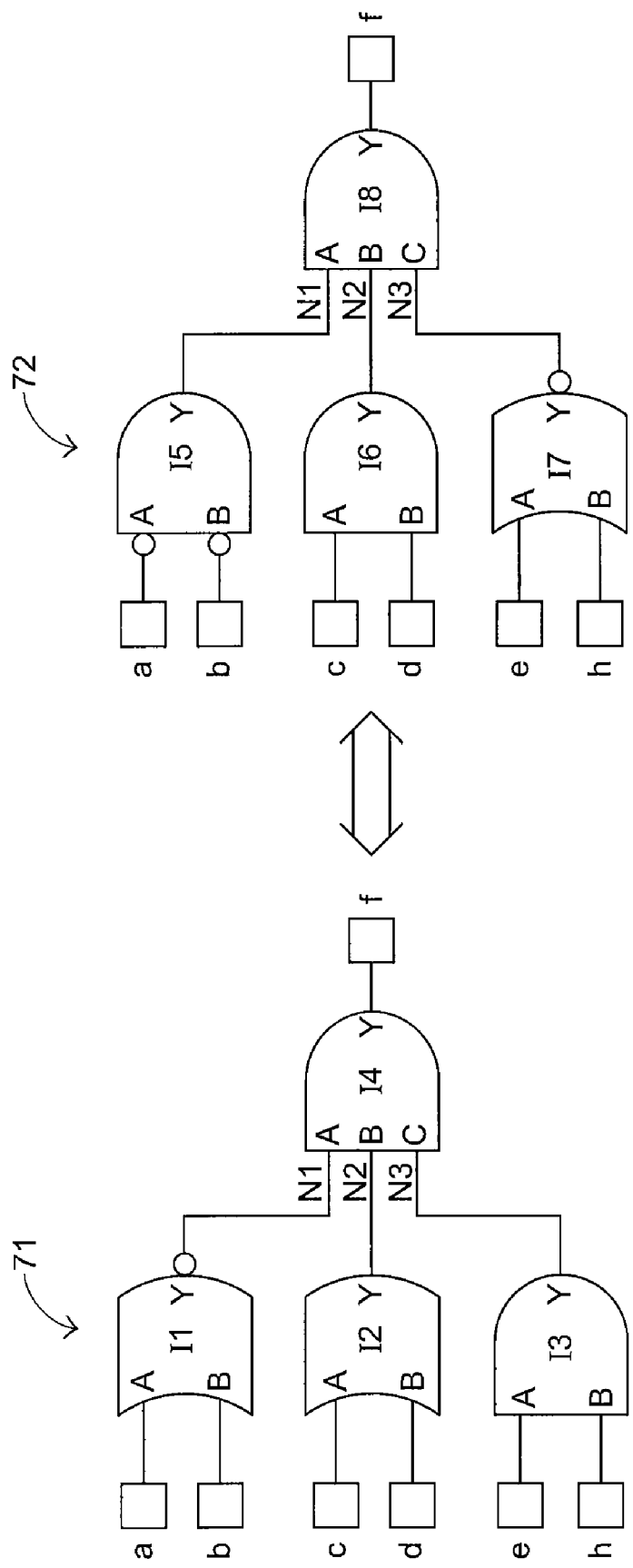
FIG. 7 is a scheme illustrating further details in Step 67 of FIG. 6D.

Furthermore, the definition of the border of equivalence is described with reference to the example of FIG. 7. On the left side of FIG. 7 is the marked circuit 71 in the post layout circuit L0 while on the right side is the marked circuit 72 corresponding to the modified circuit $Cn_{LHS}$. For finding border cells, elements in addition to the end element I4, which are equivalent to the end element I8 of the modified circuit $Cn_{LHS}$ are searched in the marked circuit 71. For example, by using EC, it is reported that Pin Y of the element I1 is equivalent to Pin Y of the element I5, and thus I1 and I5 are defined as border cells on Path N1 of the end elements I4 and I8, respectively. In contrast, since the elements I2 and I6 are not equivalent to each other, upstream elements are searched. For example, it is found that primary inputs c and d are equivalent and thus are defined as border cells on Path N2 of the end elements I4 and I8, respectively. Likewise, elements I3 and I7 are not equivalent elements. Instead, primary inputs e and h are equivalent elements and thus defined as border cells on Path N3 of the end elements I4 and I8, respectively. Then, a set of logic gates including the end element I8 and those within the border, i.e. elements I6 and I7, are defined as the minimum ECO logic to replace a specified element in the post layout circuit L0. The specified element to be replaced is a set of logic gates including the end element I4 and those within the border, i.e. elements I2 and I3.

From the above descriptions, it is understood that ECO can be easily executed according to the present invention by marking the element to be replaced and corresponding logic cone, and replacing elements associated with the marked element with elements associated with the marked logic cone. Accordingly, modification of circuit designs can be done in a short time.

Although one modified element is exemplified above, it is understood that the modified post layout circuit Ln may include a plurality of modified logic requiring to deal with respective ECO cone pairs, and the above-described method can be used for locating and replacing each modified element.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A circuit-design-modifying method executed in a computer system, comprising steps of:

performing a first synthesis-with-optimization operation of a first HDL code to generate a first circuit;

performing a first physical design of the first circuit to generate a post layout circuit;

modifying the first HDL code to generate a second HDL code, and performing a second synthesis-with-optimization operation of the first and second HDL codes while forcibly preserving specified elements to generate a second circuit and a third circuit, respectively;

performing an ECO cone-pair extraction operation of the second circuit and the third circuit to generate at least one ECO cone pair;

executing Equivalent Check (EC) according to an ECO logic cone belonging to the second circuit to locate an end element to be replaced in the post layout circuit, which is equivalent to an end element of the ECO logic cone;

marking the end element to be replaced and an ECO logic cone which belongs to the third circuit with respective effective ECO flags; and executing Equivalent Check (EC) to define a border of equivalence according to the marked end element to be replaced and the marked ECO logic cone, wherein the ECO logic is a set of logic gates including the end element of the marked logic cone and those within the border of equivalence, and then replacing the element to be replaced in the post layout circuit with the ECO logic, thereby modifying the post layout circuit into a post layout ECO circuit.

2. The circuit-design-modifying method according to claim 1 wherein the second synthesis-with-optimization operation forcibly preserves all left-hand-side elements.

3. The circuit-design-modifying method according to claim 1 wherein the ECO cone-pair extraction operation of the second circuit and the third circuit includes:
   building logic cone data structures of the second circuit and the third circuit, respectively, by a Fan-In Trace technique; and
   comparing names of the logic cones to assign a plurality of logic cone pairs, and locating the at least one ECO cone pair from the plurality of logic cone pairs by an Equivalent Check (EC) technique.

4. The circuit-design-modifying method according to claim 1 wherein the border of equivalence is defined by:
   searching equivalent elements of the marked end element and the marked ECO logic cone along a plurality of upstream paths; and
   defining the border of equivalence with the equivalent elements.

5. The circuit-design-modifying method according to claim 1 wherein the element to be replaced is removed from the post layout circuit to form an intermediate post layout circuit, and the ECO logic is added to the intermediate post layout circuit to form the post layout ECO circuit.

6. A circuit-design-modifying method executed in a computer system, comprising steps of:
   performing a first synthesis-with-optimization operation of a first HDL code to generate a first circuit;
   performing a first physical design of the first circuit to generate a post layout circuit;
   modifying the first HDL code to generate a second HDL code, and performing a second synthesis-with-optimization operation of the first and second HDL codes while forcibly preserving specified elements to generate a second circuit and a third circuit, respectively;
   performing an ECO cone-pair extraction operation of the second circuit and the third circuit to generate at least one ECO cone pair;
   executing Equivalent Check (EC) according to an ECO logic cone belonging to the second circuit to locate an end element to be replaced in the post layout circuit, which is equivalent to an end element of the ECO logic cone;
   marking the end element to be replaced and an ECO logic cone which belongs to the third circuit with respective effective ECO flags;
   executing Equivalent Check (EC) to define a border of equivalence according to the marked end element to be replaced and the marked ECO logic cone, wherein the element to be replaced is a set of logic gates including the marked end element to be replaced and those within the border of equivalence, and then replacing the element to be replaced in the post layout circuit with the ECO logic, thereby modifying the post layout circuit into a post layout ECO circuit.

* * * * *